(12) United States Patent
Meder et al.

(10) Patent No.: US 11,268,606 B2
(45) Date of Patent: Mar. 8, 2022

(54) TOOTHED WHEEL FOR AN INTERNAL COMBUSTION ENGINE OF A MOTOR VEHICLE

(71) Applicant: Bayerische Motoren Werke Aktiengesellschaft, Munich (DE)

(72) Inventors: Andreas Meder, Munich (DE); Nikolaus Koller, Martinsried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 253 days.

(21) Appl. No.: 16/040,833

(22) Filed: Jul. 20, 2018

(65) Prior Publication Data

US 2018/0328479 A1 Nov. 15, 2018

Related U.S. Application Data

(63) Continuation of application No. PCT/EP2017/050789, filed on Jan. 16, 2017.

(30) Foreign Application Priority Data

Jan. 21, 2016 (DE) ...................... 10 2016 200 764.5

(51) Int. Cl.
*F16H 55/30* (2006.01)
*F01L 1/02* (2006.01)

(52) U.S. Cl.
CPC .............. *F16H 55/30* (2013.01); *F01L 1/022* (2013.01); *F16H 2055/306* (2013.01)

(58) Field of Classification Search
CPC ...... F16H 55/30; F16H 2055/306; F16H 7/06; F16H 57/0006; B62M 21/00

USPC .......................................................... 474/161
See application file for complete search history.

(56) References Cited

U.S. PATENT DOCUMENTS

| 975,938 | A | * | 11/1910 | Downey | ................. F16H 55/30 |
| | | | | | 474/161 |
| 3,057,219 | A | * | 10/1962 | Montgomery | ............ F16H 7/06 |
| | | | | | 474/161 |
| 4,022,072 | A | * | 5/1977 | Chagawa | ........... B62D 55/0963 |
| | | | | | 474/161 |

(Continued)

FOREIGN PATENT DOCUMENTS

| CN | 1319731 A | 10/2001 |
| CN | 1570425 A | 1/2005 |

(Continued)

OTHER PUBLICATIONS

Chinese-language Office Action issued in Chinese Application No. 201780003701.2 dated Apr. 23, 2020 with English translation (14 pages).

(Continued)

*Primary Examiner* — Henry Y Liu
(74) *Attorney, Agent, or Firm* — Crowell & Moring LLP

(57) ABSTRACT

A toothed wheel system for an internal combustion engine of a motor vehicle is provided. The least one tooth system has a plurality of teeth that follow one another in the circumferential direction of the gear wheel, and at least one elastomer track adjoining the tooth system in the axial direction. The elastomer track is formed as a regular polygon on the outer circumferential side. The number of sides of the polygon correspond to the number of teeth.

5 Claims, 3 Drawing Sheets

(56) References Cited

U.S. PATENT DOCUMENTS

| | | | | |
|---|---|---|---|---|
| 4,261,214 A * | 4/1981 | Watanabe | ............... | B62M 9/00 474/151 |
| 4,348,199 A * | 9/1982 | Oonuma | ............... | F16H 55/14 305/199 |
| 4,867,733 A * | 9/1989 | Yamanoi | ............... | B62M 9/00 474/161 |
| 5,224,903 A * | 7/1993 | Langhof | ............... | B62M 9/00 474/152 |
| 5,980,408 A * | 11/1999 | Schulz | ............... | F16H 7/06 474/151 |
| 5,984,817 A * | 11/1999 | Schulz | ............... | F16H 7/06 474/156 |
| 6,179,741 B1 * | 1/2001 | Young | ............... | F16H 7/06 474/156 |
| 6,656,072 B2 * | 12/2003 | Sugita | ............... | B62M 7/02 474/156 |
| 6,910,980 B2 * | 6/2005 | Hamilton | ............... | F16H 55/06 474/156 |
| 7,074,147 B2 * | 7/2006 | Young | ............... | F16H 7/06 474/156 |
| 2001/0018379 A1 * | 8/2001 | Sugita | ............... | F16H 7/06 474/111 |
| 2002/0169044 A1 * | 11/2002 | Young | ............... | F16H 55/30 474/152 |
| 2002/0183150 A1 * | 12/2002 | Poiret | ............... | F16G 13/06 474/156 |
| 2003/0176251 A1 * | 9/2003 | Hamilton | ............... | F16H 55/30 474/161 |
| 2003/0228950 A1 * | 12/2003 | Young | ............... | F16H 7/06 474/161 |
| 2006/0073927 A1 * | 4/2006 | Haesloop | ............... | F16H 55/30 474/161 |
| 2007/0111833 A1 * | 5/2007 | Young | ............... | F16H 7/06 474/152 |
| 2009/0093329 A1 * | 4/2009 | Markley | ............... | F16H 55/30 474/161 |
| 2009/0118047 A1 * | 5/2009 | Haesloop | ............... | F16H 55/30 474/161 |
| 2011/0300977 A1 * | 12/2011 | Hayami | ............... | F16H 55/30 474/161 |
| 2013/0059689 A1 * | 3/2013 | Morishige | ............... | F16H 55/30 474/152 |
| 2015/0045165 A1 * | 2/2015 | Kwon | ............... | F16H 55/30 474/161 |
| 2015/0176692 A1 * | 6/2015 | Roh | ............... | F16H 55/30 474/156 |
| 2017/0030453 A1 * | 2/2017 | Young | ............... | F16H 55/30 |

FOREIGN PATENT DOCUMENTS

| | | |
|---|---|---|
| DE | 299 09 603 U1 | 11/1999 |
| DE | 199 43 000 A1 | 12/2000 |
| DE | 603 05 682 T2 | 5/2007 |
| DE | 10 2011 102 463 A1 | 12/2011 |
| EP | 1 184 593 A1 | 3/2002 |
| EP | 1 184 593 B1 | 3/2005 |
| JP | H112312 A | 1/1999 |
| KR | 10 2006 0062511 A | 6/2006 |
| WO | WO 2007/087501 A1 | 8/2007 |

OTHER PUBLICATIONS

International Search Report (PCT/ISA/210) issued in PCT Application No. PCT/EP2017/050789 dated Apr. 21, 2017 with English translation (four (4) pages).

German-language Written Opinion (PCT/ISA/237) issued in PCT Application No. PCT/EP2017/050789 dated Apr. 21, 2017 (five (5) pages).

German-language Search Report issued in counterpart German Application No. 102016200764.5 dated Jun. 17, 2016 with partial English translation (ten (10) pages).

Chinese-language Office Action issued in Chinese Application No. 201780003701.2 dated Oct. 27, 2020 with English translation (11 pages).

Office Action issued in counterpart Chinese Application No. 201780003701.2 (with English Translation), dated Apr. 16, 2021 (12 pages).

* cited by examiner

TOOTHED WHEEL FOR AN INTERNAL COMBUSTION ENGINE OF A MOTOR VEHICLE

CROSS REFERENCE TO RELATED APPLICATIONS

This application is a continuation of PCT International Application No. PCT/EP2017/050789, filed Jan. 16, 2017, which claims priority under 35 U.S.C. § 119 from German Patent Application No. 10 2016 200 764.5, filed Jan. 21, 2016, the entire disclosures of which are herein expressly incorporated by reference.

BACKGROUND AND SUMMARY OF THE INVENTION

The invention relates to a toothed wheel, in particular for an internal combustion engine of a motor vehicle, having a plurality of teeth which follow one another in the circumferential direction of the toothed wheel and including at least one elastomer track which adjoins the tooth system in the axial direction, the at least one elastomer track being formed as a regular polygon on the outer circumferential side with a number of sides corresponding to the number of teeth.

Such a toothed wheel, in particular for an internal combustion engine of a motor vehicle, is already known from DE 10 2011 102 463 A1, for example. The toothed wheel has at least one tooth system which has a plurality of teeth which follow one another in the circumferential direction of the toothed wheel. Here, respective tooth gaps are arranged between the teeth, with the result that the teeth can engage, for example, in corresponding clearances of a chain. The toothed wheel can thereby interact with the chain in a form-fitting manner via the tooth system such that, for example, the chain can be driven by the toothed wheel or else the toothed wheel can be driven by the chain.

Furthermore, the toothed wheel has at least one elastomer track which adjoins the tooth system in the axial direction. The elastomer track is a track or a pathway made of an elastomer, with the elastomer track being arranged next to the tooth system in the axial direction and extending so as to completely run around for example in the circumferential direction of the toothed wheel, that is to say without interruption. The toothed wheel has, for example, a chain track along which the chain runs if the toothed wheel taking the form of a chain wheel rotates and interacts with the chain. Here, at least the tooth system is arranged in the chain track, with the elastomer track being arranged laterally or in the axial direction next to the chain track. The elastomer track makes it possible for excess striking of the chain on the toothed wheel to be damped if the chain runs into the chain track. The generation of noise can be reduced as a result.

In DE 10 2011 102 463 A1, the elastomer track is designed to be corrugated on the outer circumferential side and thus has a plurality of successive corrugation peaks and a plurality of successive corrugation troughs, with the corrugation peaks alternating with the corrugation troughs in the circumferential direction of the elastomer track. This means that a corrugation trough of the elastomer track is arranged between every two corrugation peaks which directly follow one another in the circumferential direction of the toothed wheel.

It is an object of the present invention to further develop a toothed wheel of the type stated at the outset in such a way that a particularly high degree of robustness and a particularly advantageous noise behavior of the toothed wheel can be achieved.

In order to further develop a toothed wheel of the type specified in such a way that a particularly high degree of robustness and a particularly advantageous noise behavior of the toothed wheel can be achieved, there is provision according to the invention that the elastomer track is formed as a regular polygon at least on the outer circumferential side, the number of sides of said polygon corresponding to the number of teeth. In other words, the elastomer track is formed as a regular polygonal profile at least on the outer circumferential side, the number of sides of said profile corresponding to the number of teeth.

The invention is based in particular on the following finding: in the case of conventional elastomer tracks configured for example with a corrugated shape, a customary chain link plate of a conventional roller chain or sleeve chain penetrates the elastomer track or the elastomer thereof nonuniformly, since the chain link plate has a straight side via which the chain link plate is supported on the elastomer track. By contrast to the straight side of the chain link plate, the conventional elastomer tracks are not straight, but curved or corrugated. This leads in the long run to damage to the elastomer track in the region of the deepest penetration, or the acoustic effectiveness of the elastomer track in terms of damping the chain and thus in terms of avoiding noise is not completely utilized if an excessively small overlap is selected.

Against this background, the polygon, in particular its straight sides, constitutes an ideal counter-partner for the chain link plate, in particular its shape or its straight side, resulting in uniform overlapping and thus penetration over as long a region of the chain link plate as possible. The configuration of the chain link plate with a straight side is advantageous for the chain overall, which means that a different design of the chain link plate can be disadvantageous. The elastomer track is therefore adapted in terms of its shape to the shape of the chain link plate.

These disadvantages can now be avoided since the elastomer track is formed as a regular polygon on the outer circumferential side, the number of sides of said polygon corresponding to the number of teeth. This makes it possible to achieve a particularly uniform overlapping of the chain with the elastomer track, with the result that the generation of noise during the operation of the toothed wheel can be avoided or be at least kept low. Moreover, excessive wear of the elastomer track can also be avoided over a long service life of the toothed wheel. Furthermore, upon its run-in into a chain track of the toothed wheel that comprises the tooth system, the chain can be effectively damped by the elastomer track, with the result that an excessively hard knocking or striking of the chain against the toothed wheel can be avoided.

For example in combination with standard chains with a straight link plate shape it is possible, through the configuration of the elastomer track as a polygon or polygonal profile, for there to be achieved an at least substantially uniform overlapping with the elastomer track over the entire link plate length. The acoustic effectiveness of the elastomer track is thereby optimized or occurring damage can be minimized. This results in a particularly long service life of the elastomer track, and therefore the chain and thus noise can also be effectively damped by the elastomer track over a long service life of the toothed wheel.

It has been shown to be particularly advantageous if in each case one of the sides of the polygon is arranged centrally with respect to in each case one of the teeth. In other words, the polygon is preferably oriented such that in each case one of the sides of the polygon is situated centrally below in each case one of the teeth of the tooth system. What is to be understood by this is that the elastomer track is not for instance covered outwardly in the radial direction by the teeth, but that the elastomer track is arranged next to the teeth in the axial direction and thus is oriented relative to the teeth in the circumferential direction in such a way that respective centers of the teeth and of the sides of the polygon coincide. In other words, there is provision in this embodiment that a respective center plane of the respective side that extends in the axial direction of the toothed wheel coincides with a respective center plane of the respective tooth that extends in the axial direction of the toothed wheel. Excessive loading on the elastomer track that emanates from the chain can thereby be avoided, with the result that excessive wear of the elastomer track can be avoided. Furthermore, the chain can be damped particularly well as a result.

In a further advantageous refinement of the invention, the respective sides of the polygon adjoin one another without interruption in the circumferential direction of the toothed wheel. What is to be understood by this is that no clearances which are set back inwardly in the radial direction with respect to the sides are arranged between the respective sides in the circumferential direction, but the sides directly adjoin one another without respective depressions or clearances being arranged between the sides. As a result, excessive local loading of the elastomer track can be avoided.

In order to be able to damp the chain and thus noise in a particularly advantageous manner, there is provision in a further embodiment of the invention that the elastomer track is formed from a hydrated acrylonitrile butadiene rubber (HNBR).

In order to achieve a particularly high degree of robustness of the elastomer track and thus of the toothed wheel overall, there is provision in a further embodiment of the invention that the polygon is a regular convex polygon. This is to be understood as a geometric figure in the form of a polygon, with this figure having no indentation at any point.

Finally, it has been shown to be advantageous if the toothed wheel takes the form of a chain wheel for a chain drive. In its completely produced state, the chain drive comprises the toothed wheel in the form of a chain wheel and at least one chain which at least partially wraps around the toothed wheel in its circumferential direction. Here, the toothed wheel engages for example in respective clearances of the chain by way of its teeth, with the result that the toothed wheel interacts with the chain in a form-fitting manner. As a result, the toothed wheel can be driven by the chain or the chain can be driven by the toothed wheel. The clearances are formed for example by chain links and/or chain link plates.

The invention also includes an internal combustion engine for a motor vehicle which can be driven by the internal combustion engine. The internal combustion engine includes a chain drive which has at least one toothed wheel according to the invention and at least one chain which at least partially wraps around the toothed wheel. Advantages and advantageous refinements of the toothed wheel according to the invention can be considered as advantages and advantageous refinements of the internal combustion engine according to the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

Identical or functionally identical elements are provided in the figures with the same reference signs.

DETAILED DESCRIPTION OF THE DRAWINGS

Figure 1:
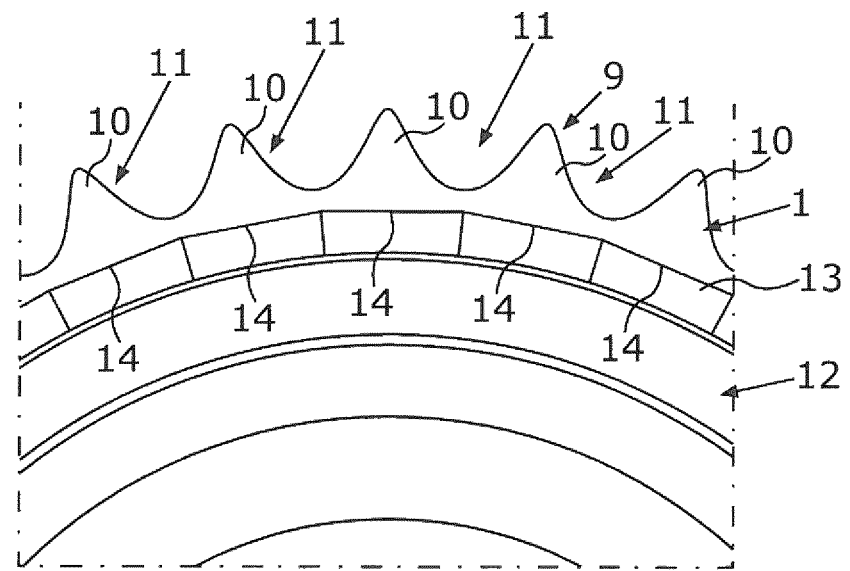
FIG. 1 shows a schematic front view of a toothed wheel in accordance with an embodiment of the present invention.

FIG. 1 shows, in the form of a detail in a schematic front view, a toothed wheel in the form of a chain wheel 1 for an internal combustion engine of a motor vehicle, in particular of a car. The motor vehicle can be driven by the internal combustion engine, with the internal combustion engine taking the form of a reciprocating piston engine, for example. The internal combustion engine comprises at least one housing element and an output shaft which is designed for example as a crankshaft and mounted on the housing element so as to be rotatable about an axis of rotation relative to the housing element. The internal combustion engine, via the output shaft, provides torques for driving the motor vehicle.

Figure 3:
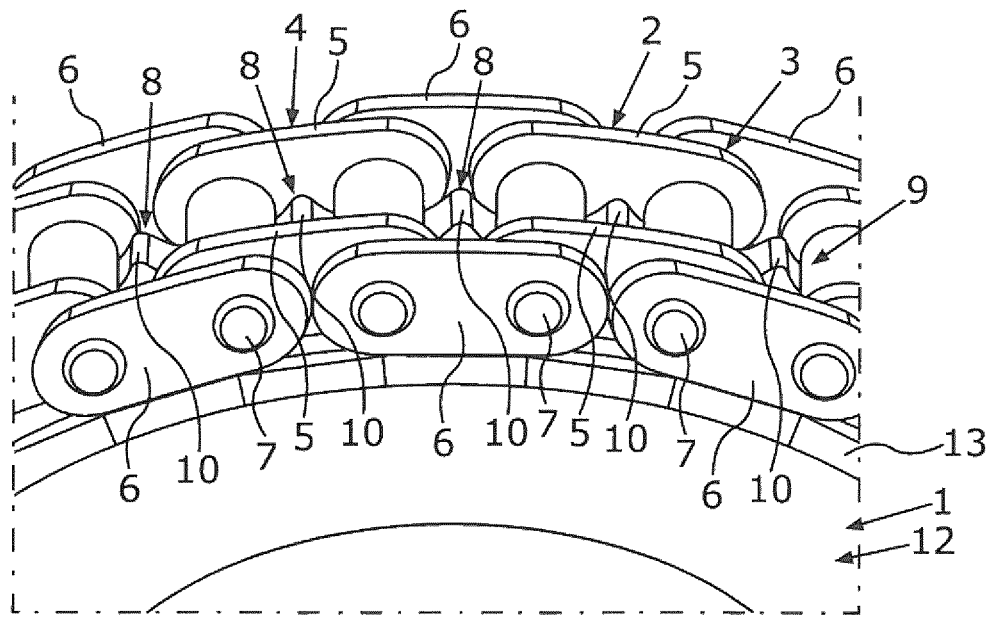
FIG. 3 shows a schematic perspective view of another embodiment of the present invention in which a chain drive includes a toothed wheel and a chain which at least partially wraps around the toothed wheel.
Figure 4:
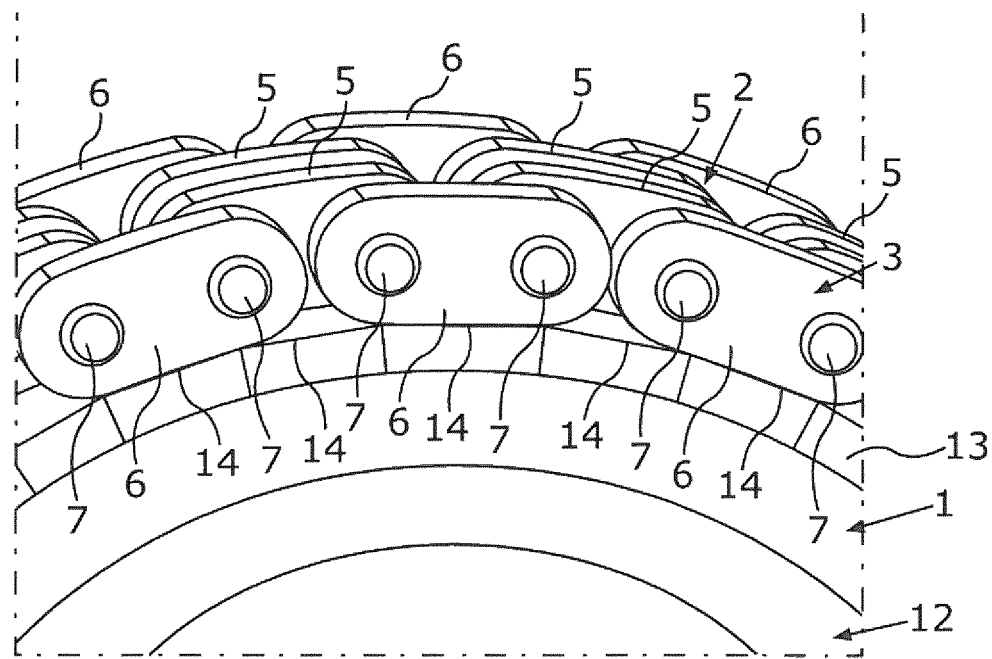
FIG. 4 shows a further schematic perspective view of the chain drive of FIG. 3.
Figure 5:
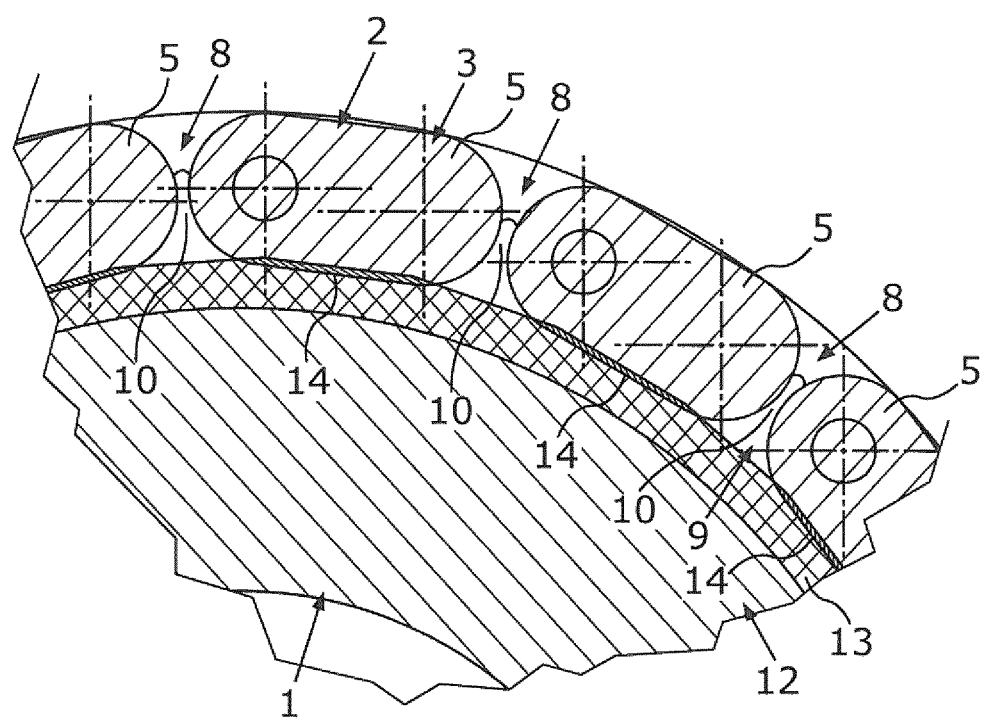
FIG. 5 shows a schematic and sectioned front view of the chain drive of FIG. 3.

The internal combustion engine further has at least one combustion chamber in particular in the form of a cylinder, with the cylinder being assigned at least one gas exchange valve for controlling the gas exchange of the cylinder. Here, the gas exchange valve can be moved, in particular translationally, between a closed position and at least one open position. To move the gas exchange valve from the closed position into the open position, the internal combustion engine includes, for example, a camshaft which can be rotated about an axis of rotation and which can be driven by the output shaft. For this purpose, there is provided a wraparound drive in the form of a chain drive via which the camshaft is coupled to the output shaft, said chain drive being designated overall by 2 and being visible in the form of a detail from FIGS. 3 to 5.

Here, the chain drive 2 includes the chain wheel 1 and at least one further chain wheel which is not shown in the figure. In the ready-produced state of the internal combustion engine, the chain wheel 1 is for example connected to the output shaft for conjoint rotation therewith and can accordingly be driven by the output shaft. The further chain wheel is for example connected to the camshaft for conjoint rotation therewith, with the result that the camshaft can be driven by the further chain wheel. The chain drive 2 comprises a wraparound line, in the present case in the form of a chain 3, which at least partially wraps and extends around the chain wheel 1 and the further chain wheel, in each case in the circumferential direction of the respective chain wheel.

The chain 3 includes, for example, a plurality of chain links 4 with respective chain link plates 5. Furthermore, the chain 3 includes further chain link plates 6 via which the chain links 4 are articulately connected to one another. Here, the chain link plates 5 are articulately connected to the chain link plates 6 via respective bolts 7. The chain 3 is designed, for example, as a conventional roller chain or sleeve chain. It can further be seen from FIG. 3 that clearances 8 of the chain 3 are formed by the chain links 4 and/or the link plates 6.

Figure 2:
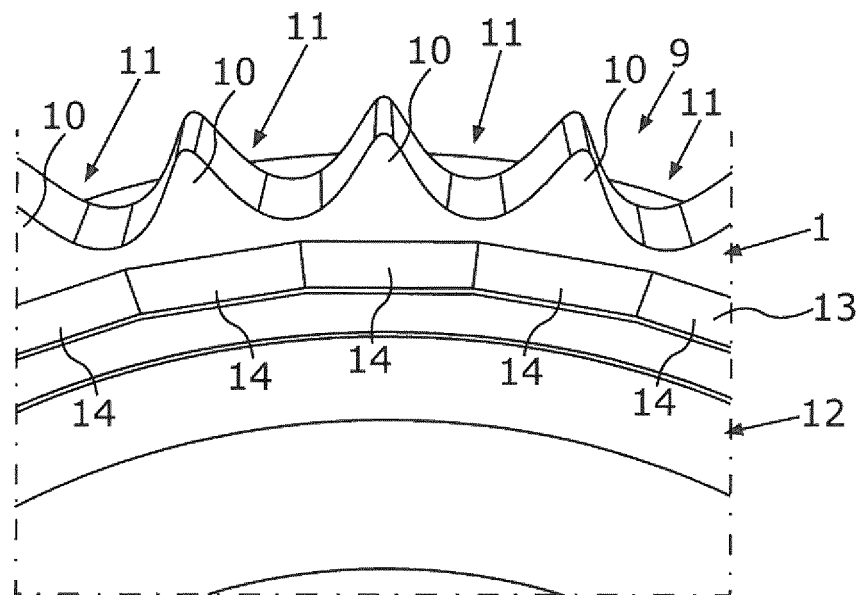
FIG. 2 shows a schematic perspective view of the toothed wheel of FIG. 1.

The chain wheel 1 has at least one tooth system 9 which is arranged in a so-called chain track as can be seen particularly well from FIGS. 1 and 2. The tooth system 9 has a plurality of teeth 10 which follow one another in the circumferential direction of the chain wheel 1. Furthermore, the tooth system 9 includes tooth gaps 11, with precisely one of the tooth gaps 11 being arranged between every two teeth 10 which directly follow one another in the circumferential direction of the chain wheel 1. Consequently, the teeth 10 and the tooth gaps 11 alternate in the circumferential direction of the chain wheel 1. As a result, at least a part of the teeth 10 can engage in a corresponding part of the clearances 8 if the chain 3 wraps around the chain wheel 1. The chain wheel 1 interacts with the chain 3 in a form-fitting manner due to this engagement, with the result, for example, that the chain wheel 1 can be driven by the chain 3 or the chain 3 can be driven by the chain wheel 1. In this way, the further chain wheel also interacts with the chain 3 in a form-fitting manner, with the result that the camshaft can be driven by the output shaft via the further chain wheel, the chain 3 and the chain wheel 1. The chain drive 2 thus forms a control drive by which the camshaft can be driven and thus the gas exchange valve can be actuated. If the chain wheel 1 rotates with the output shaft, the chain 3 runs into the chain track of the chain wheel 1 and thus comes into form-fitting interaction with the tooth system 9.

The chain wheel 1 has, for example, a basic body 12 which is formed, for example, from a metallic material, in particular from a steel. Here, the tooth system 9 is formed by the basic body 12. In order now to avoid an excessively hard knocking of the chain against the chain wheel 1 if the chain runs into the chain track, the chain wheel 1 has an elastomer track 13 which adjoins the tooth system 9 and thus the chain track in the axial direction. In particular, such an elastomer track 13 adjoins the tooth system on both sides in the axial direction of the chain wheel 1, with the result that the chain 3 is damped by the respective elastomer track 13 upon its run-in into the chain track. The generation of excessive noise can thereby be avoided, with the result that a particularly advantageous noise behavior of the toothed wheel 1 and thus of the chain drive 2 overall can be realized.

The elastomer track 13 is for example an at least substantially annular track composed of an elastomer, in particular rubber, the elastomer track 13 being formed for example from HBNR. This means that the elastomer track 13 is formed from an elastically deformable material. Upon its run-in into the chain track, the chain 3 strikes the elastomer track 13, whereby the elastomer track 13 is elastically deformed. Impact energy is thereby converted into deformation energy, with the result that the chain 3 or its run-in is damped. Noise is consequently damped, with the result that the generation of noise can be avoided or at least kept low. For example, the elastomer track 13 is formed as a layer of rubber which is applied to the basic body 12, with the result that the chain wheel 1 takes the form of a rubberized toothed wheel or a rubberized chain wheel.

In order now to achieve a particularly advantageous noise behavior and a particularly high degree of robustness of the chain wheel 1, the elastomer track 13 is formed as a regular polygon at least on the outer circumferential side, the number of sides 14 of said polygon corresponding to the number of teeth 10. This means that the elastomer track 13 is formed as a regular polygonal profile and in the present case as a regular convex polygon at least on the outer circumferential side, with the respective sides 14 adjoining one another without interruption in the circumferential direction of the chain wheel 1. Here, in each case one of the sides 14 of the polygon is arranged centrally with respect to in each case one of the teeth 10. In other words, the polygonal profile, that is to say the elastomer track 13, is oriented relative to the teeth 10 in the circumferential direction such that in each case one side 14 of the polygon is situated centrally below in each case one tooth 10 of the chain wheel 1.

Thus, a respective imaginary center plane of the respective side 14 that extends in the axial direction of the chain wheel 1 coincides with a respective imaginary center plane of the respective tooth 10 that extends in the axial direction of the chain wheel 1. Consequently, as can be seen particularly well from FIGS. 4 and 5, the chain 3, upon its run-in into the chain track, is supported and damped particularly well by the elastomer track 13, with it being possible for an excessive penetration of the chain 3 into the elastomer track 13 to be avoided. As a result, excessive loads acting on the elastomer track 13 by the chain 3 and thus an excessive wear of the elastomer track 13 can be avoided, resulting in a long service life of the elastomer track 13. In other words, damage can be minimized in comparison to conventional chain wheels and chain drives with simultaneous optimization of the acoustic effectiveness of the elastomer track 13, since the latter can damp the chain 3 particularly well by virtue of its polygonal shape.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Chain wheel
2 Chain drive
3 Chain
4 Chain link
5 Chain link plate
6 Chain link plate
7 Bolt
8 Clearance
9 Tooth system
10 Tooth
11 Tooth gap
12 Basic body
13 Elastomer track
14 Side

What is claimed is:

1. A toothed wheel for an internal combustion engine of a motor vehicle, comprising:
   at least one tooth system having a plurality of teeth which follow one another in a circumferential direction of the toothed wheel; and
   at least one elastomer track axially adjacent to the at least one tooth system along a rotation axis of the at least one tooth system,
   wherein the elastomer track has a regular polygon shape on an outer circumferential side and a circular shape on an inner circumferential side, a number of sides of the polygon corresponds to a number of the plurality of teeth, each of the polygon sides is arranged centrally with respect to a corresponding one of the plurality of teeth, opposite ends of each of the polygonal sides have a radial height larger than a radial height at a center of each of the polygonal sides, and the polygon sides adjoin one another without interruption in the circumferential direction of the toothed wheel.

2. The toothed wheel as claimed in claim 1, wherein the at least one elastomer track is formed from hydrated acrylonitrile butadiene rubber.

3. The toothed wheel as claimed in claim 1, wherein the polygon shape is a regular convex polygon.

4. The toothed wheel as claimed in claim 1, wherein the toothed wheel is a chain wheel of a chain drive.

5. An internal combustion engine for a motor vehicle, comprising a chain drive having at least one toothed wheel with a plurality of teeth which follow one another in a circumferential direction of the toothed wheel, and at least one elastomer track axially adjacent to the at least one tooth system along a rotation axis of the at least one tooth system; and at least one chain configured to at least partially wrap around the toothed wheel, wherein the elastomer track has a regular polygon shape on an outer circumferential side and a circular shape on an inner circumferential side, a number of sides of the polygon corresponds to a number of the plurality of teeth, each of the polygon sides is arranged centrally with respect to a corresponding one of the plurality of teeth, opposite ends of each of the polygonal sides have a radial height larger than a radial height at a center of each of the polygonal sides; and the polygon sides adjoin one another without interruption in the circumferential direction of the toothed wheel.

\* \* \* \* \*